(12) United States Patent
Cha

(10) Patent No.: US 7,944,975 B2
(45) Date of Patent: May 17, 2011

(54) INTER-FRAME PREDICTION METHOD IN VIDEO CODING, VIDEO ENCODER, VIDEO DECODING METHOD, AND VIDEO DECODER

(75) Inventor: Sang-chang Cha, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1363 days.

(21) Appl. No.: 11/105,388

(22) Filed: Apr. 14, 2005

(65) Prior Publication Data

US 2005/0232359 A1 Oct. 20, 2005

(30) Foreign Application Priority Data

Apr. 14, 2004 (KR) .................. 10-2004-0025850

(51) Int. Cl.
*H04N 7/12* (2006.01)
(52) U.S. Cl. .................. 375/240.25; 375/240.16
(58) Field of Classification Search .................. 375/240, 375/240.01, 240.25, 240.16, 240.29; 725/41
See application file for complete search history.

(56) References Cited

U.S. PATENT DOCUMENTS

| | | | | |
|---|---|---|---|---|
| 6,963,613 | B2* | 11/2005 | MacInnis et al. | 375/240.25 |
| 2001/0056575 | A1* | 12/2001 | Wei et al. | 725/41 |
| 2002/0136303 | A1* | 9/2002 | Sun et al. | 375/240.16 |

FOREIGN PATENT DOCUMENTS

| | | |
|---|---|---|
| JP | 2000-224590 A | 8/2000 |
| KR | 1994-0020779 A | 9/1994 |
| KR | 2000-0038978 A | 7/2000 |
| KR | 2001-0087552 A | 9/2001 |
| KR | 2002-0007915 A | 1/2002 |

OTHER PUBLICATIONS

J.S. Jin et al., "A Stable Vision System for Moving Vehicles", IEEE Transactions on Intelligent Transportation Systems, vol. 1, pp. 32-39, Mar. 2000.
Xiahua Yang, "Interframe Predictive Coding for Two Special Cases: Zooming and Rotation", Proceedings of the 1993 IEEE Region 10 Conference on Computer, Communication, Control and Power Engineering, vol. 3, pp. 438-441, Oct. 19-21, 1993.

* cited by examiner

*Primary Examiner* — Allen Wong
(74) *Attorney, Agent, or Firm* — Sughrue Mion, PLLC

(57) ABSTRACT

An inter-frame prediction method in video coding, a video encoder using the same, a bitstream structure, a video decoding method, and a video decoder are provided. The inter-frame prediction method in video encoding includes estimating a motion vector between a current block in an input frame and a reference block in a reference frame corresponding to the current block and a filtering mode defining a spatial effect to be applied to at least one of the current block and the reference block, and interceding the input frame according to the estimated motion vector and the filtering mode.

7 Claims, 17 Drawing Sheets

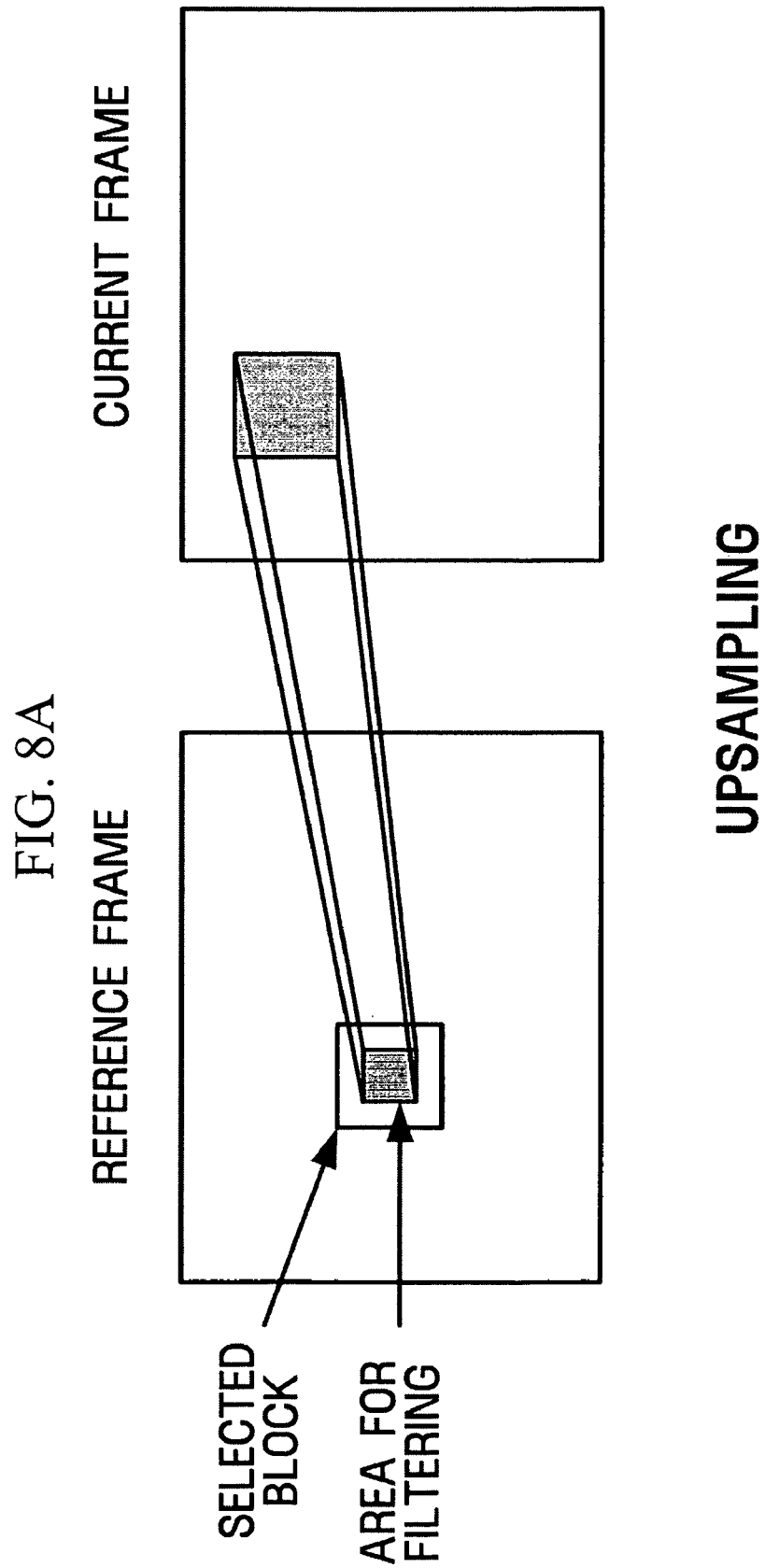

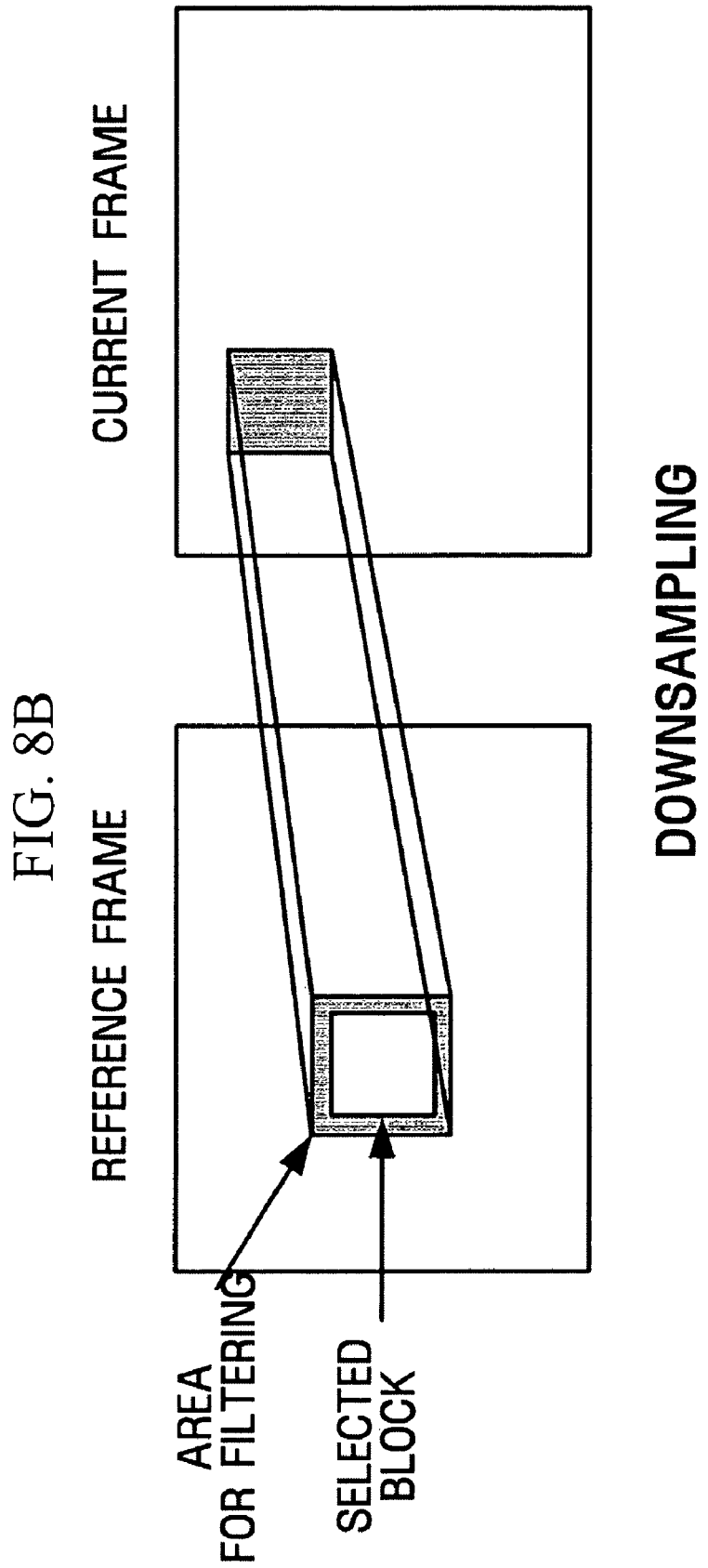

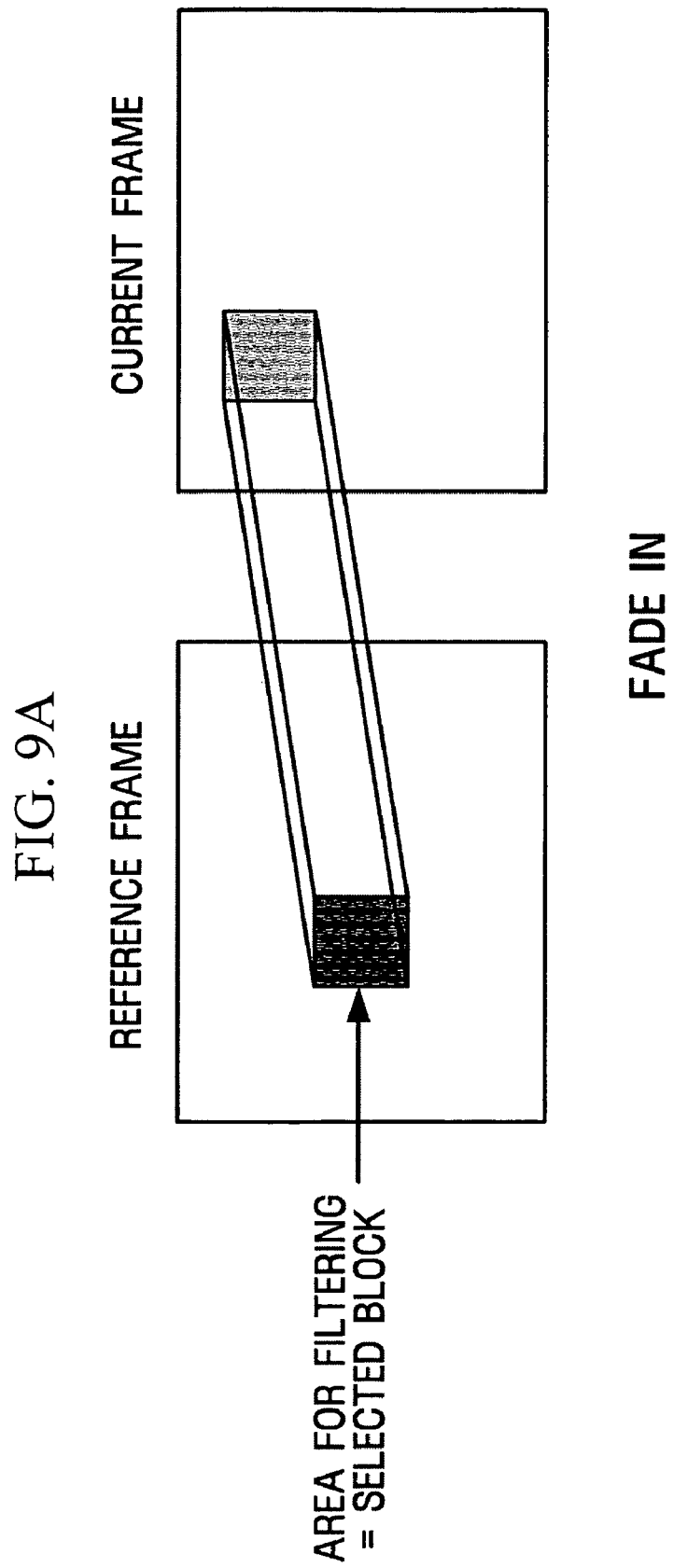

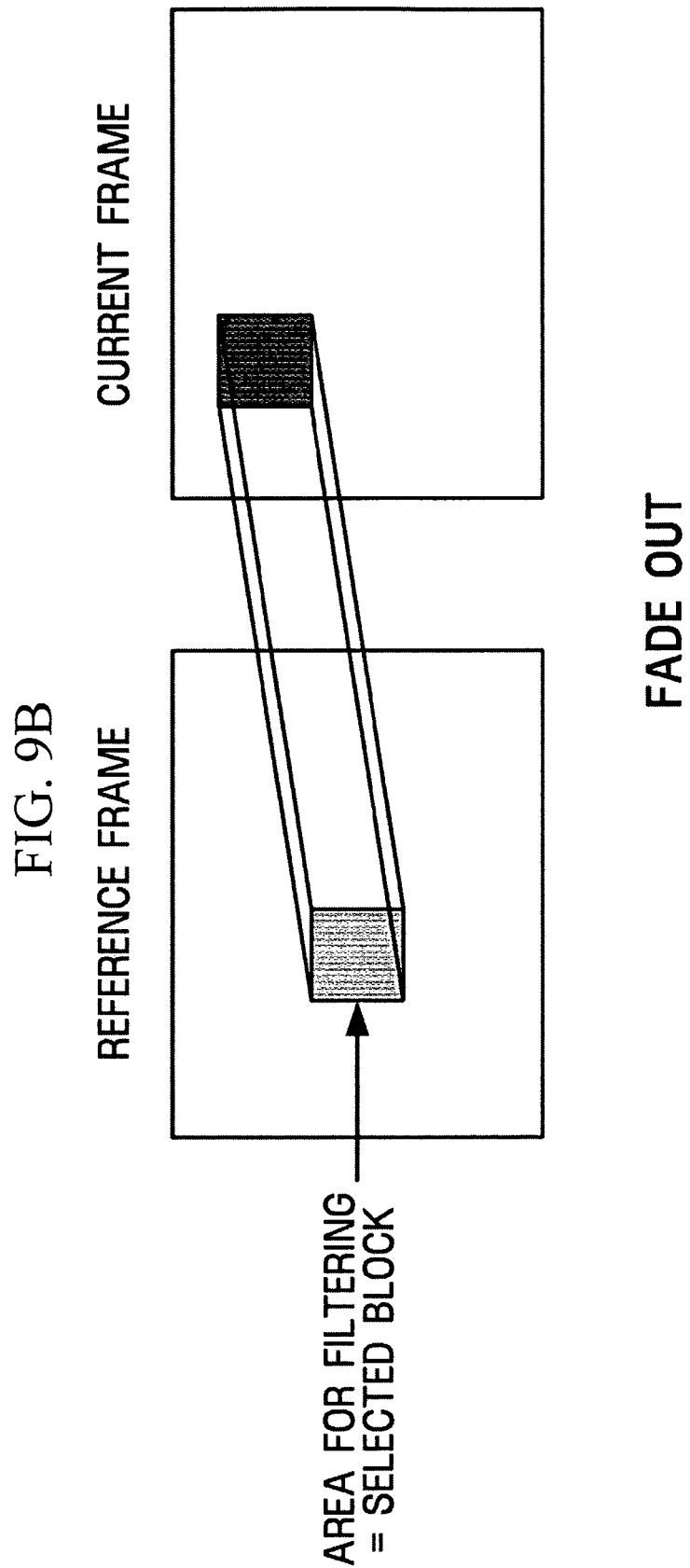

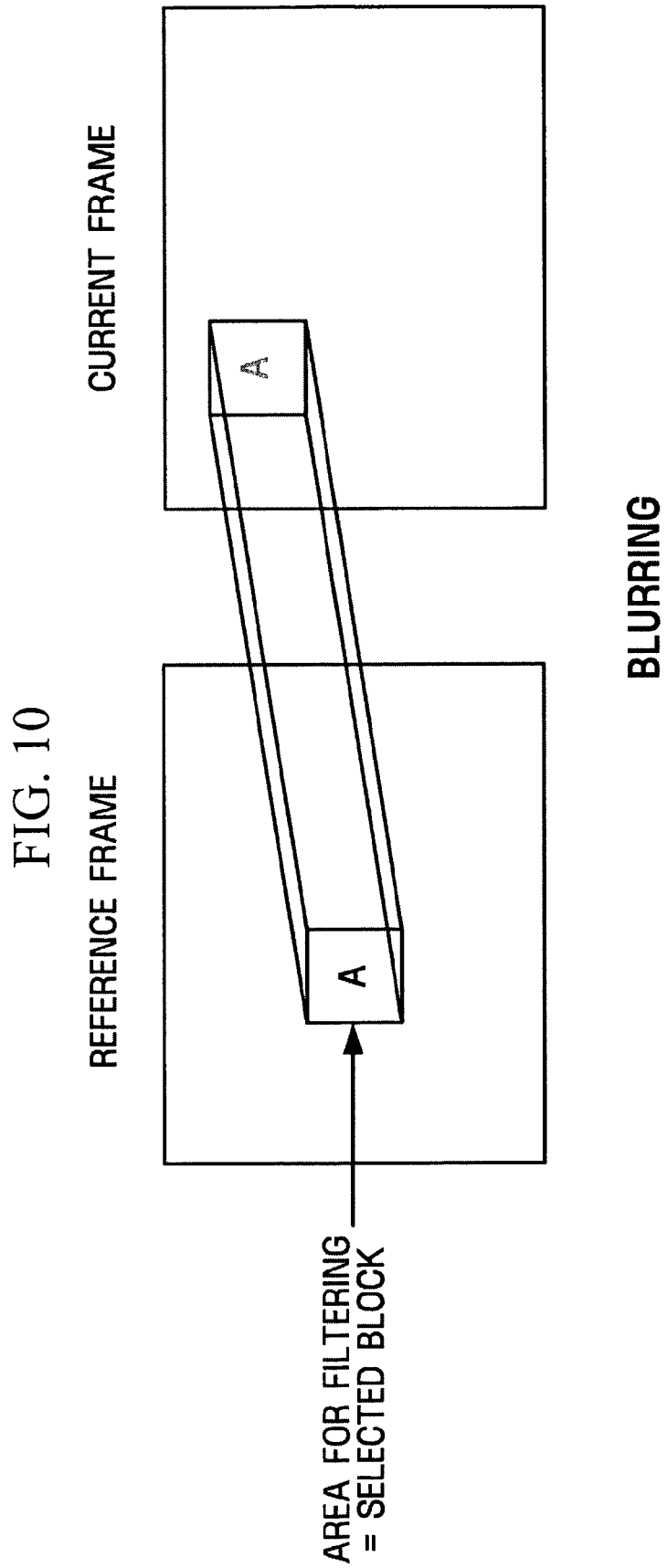

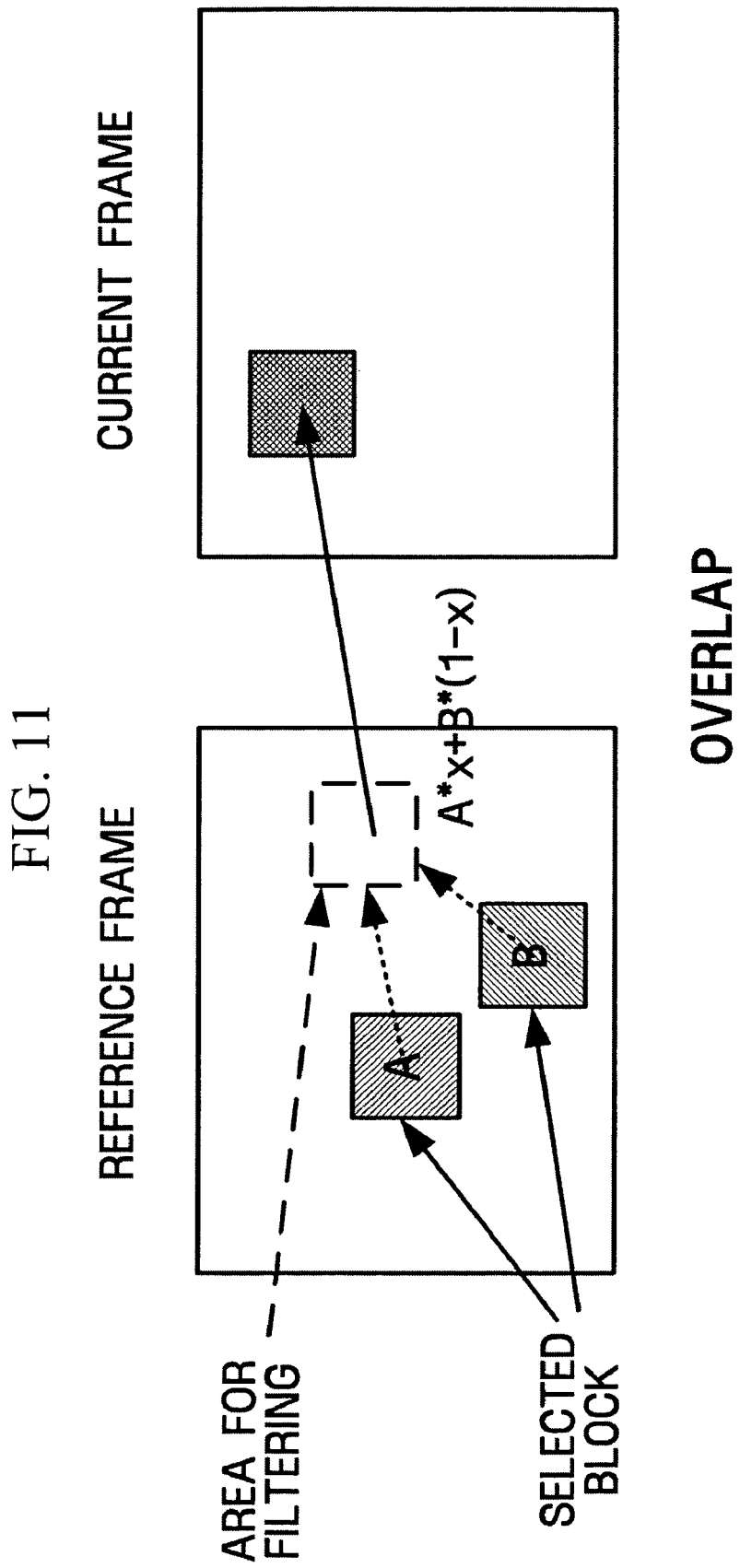

INTER-FRAME PREDICTION METHOD IN VIDEO CODING, VIDEO ENCODER, VIDEO DECODING METHOD, AND VIDEO DECODER

CROSS-REFERENCE TO RELATED APPLICATION

This application claims priority from Korean Patent Application No. 10-2004-0025850 filed on Apr. 14, 2004, in the Korean Intellectual Property Office, the disclosure of which is incorporated herein by reference in its entirety.

BACKGROUND OF THE INVENTION

1. Field of the Invention

The present invention relates to video coding and decoding, and more particularly, to an inter-frame prediction method in video coding, a video encoder using the same, a bitstream structure, a video decoding method, and a video decoder.

2. Description of the Related Art

With the development of information communication technology including the Internet, video communication as well as text and voice communication has increased. Conventional text communication cannot satisfy the various demands of users, and thus multimedia services that can provide various types of information such as text, pictures, and music have increased. Multimedia data requires a large capacity storage medium and a wide bandwidth for transmission since the amount of multimedia data is usually large. For example, a 24-bit true color image having a resolution of 640*480 needs a capacity of 640*480*24 bits, i.e., data of about 7.37 Mbits, per frame. When this image is transmitted at a speed of 30 frames per second, a bandwidth of 221 Mbits/sec is required. When a 90-minute movie based on such an image is stored, a storage space of about 1200 Gbits is required. Accordingly, a compression coding method is a requisite for transmitting multimedia data including text, video, and audio.

A basic principle of data compression is removing data redundancy. Data can be compressed by removing spatial redundancy in which the same color or object is repeated in an image, temporal redundancy in which there is little change between adjacent frames in a moving image or the same sound is repeated in audio, or mental visual redundancy taking into account human eyesight and limited perception of high frequency. Data compression can be classified into lossy/lossless compression according to whether source data is lost, intraframe/interframe compression according to whether individual frames are compressed independently, and symmetric/asymmetric compression according to whether time required for compression is the same as time required for recovery. In addition, data compression is defined as real-time compression when a compression/recovery time delay does not exceed 50 ms and as scalable compression when frames have different resolutions. For text or medical data, lossless compression is usually used. For multimedia data, lossy compression is usually used. Meanwhile, intraframe compression is usually used to remove spatial redundancy, and interframe compression is usually used to remove temporal redundancy.

Different types of transmission media for multimedia data have different performance. Currently used transmission media have various transmission rates. For example, an ultra-high-speed communication network can transmit data in several tens of megabits per second while a mobile communication network has a transmission rate of 384 kilobits per second. Conventional video coding methods such as Motion Picture Experts Group (MPEG)-1, MPEG-2, H.263, and H.264 remove temporal redundancy and spatial redundancy based on a motion compensated prediction coding technique. Specifically, in the conventional video coning methods, temporal redundancy is removed by motion compensation and spatial redundancy is removed by transform coding.

FIG. 1 is a diagram for explaining the concept of inter-frame prediction used to remove temporal redundancies.

Referring to FIG. 1, the inter-frame prediction is performed as follows. A search is performed to locate a reference block in a reference frame to be compared with a block currently being encoded (current block) in a frame currently being encoded (current frame). During the search, candidate blocks, matched with corresponding blocks within a predetermined search area of the reference frame, are found. After a plurality of candidate blocks are found in this way in the reference frame, a cost in inter-coding is calculated between the current block and each candidate block, and a candidate block minimizing the cost is selected as the reference block. In this case, the difference between the positions of the reference block and the current block is represented by a motion vector for the current block. In the inter-frame prediction, a motion vector is determined for each block in the current frame in this way and the current block is compared against the reference block corresponding to the motion vector, thereby generating a residual frame with reduced amount of data.

FIG. 2 is a block diagram of a conventional video encoder.

To generate an encoded frame 250 for an original frame 210, the conventional video encoder includes a motion prediction module 220, a transform module 230, and a quantization module 240. In a closed-loop video coding algorithm such as MPEG-2, for motion prediction, a reconstructed frame obtained by decoding the previously encoded frame is used as a reference frame instead of an original frame. To accomplish this, the video encoder further includes an inverse quantization module 260 and an inverse transform module 270.

When the original frame 210 is encoded as an intraframe, it passes through the transform module 230 and the quantization module 240. On the other hand, when the original frame 210 is encoded as an interframe, it is first input into the motion prediction module 220. A motion estimation module 222 of the motion prediction module 220 estimates motion between the input frame and a reference frame 280. After motion estimation, the input frame is compared with a motion-compensated reference frame by a comparator module 226 in order to generate a residual frame. The residual frame is then subjected to spatial transform by the transform module 230 and quantized by the quantization module 240. The encoded frame 250 obtained after the spatial transform and quantization then goes through the inverse quantization module 260 and the inverse transform module 270 so that it can be used as a reference frame to encode another frame. The frame subjected to the inverse transform is added to the motion-compensated reference frame by the adder 228 and the resultant frame is reconstructed as the reference frame 280.

A conventional video coding scheme uses motion estimation and motion compensation to enable efficient video coding. However, zooming in/out or fading in/out on a video sequence in the conventional video coding scheme increases the amount of data contained in a residual image, thereby decreasing video coding efficiency. Thus, there is a need for a video coding scheme capable of providing efficient coding under all circumstances.

SUMMARY OF THE INVENTION

The present invention provides a method for providing efficient video coding under various circumstances and a video encoder employing the same.

The present invention also provides a video decoding method reconstructing a video sequence from a bitstream encoded by the video encoder and a video decoder performing the same.

The above stated aspects as well as other aspects, features and advantages, of the present invention will become clear to those skilled in the art upon review of the following description, the attached drawings and appended claims.

According to an aspect of the present invention, there is provided an inter-frame prediction method in video encoding including: estimating a motion vector between a current block in an input frame and a reference block in a reference frame corresponding to the current block and a filtering mode defining a spatial effect to be applied to at least one of the current block and the reference block; and interceding the input frame according to the estimated motion vector and the filtering mode.

According to another aspect of the present invention, there is provided a video encoder including a motion prediction and filtering unit estimating a motion vector between a current block in an input frame and a reference block in a reference frame corresponding to the current block and a filtering mode defining a spatial effect to be applied to at least one of the current block and the reference block and predicting the motion of and filtering out the input frame according to the estimated motion vector and the filtering mode, respectively, a transform unit spatially transforming the motion-predicted and filtered frame, a quantizer applying quantization to the spatially transformed frame, and a bitstream generator generating a bitstream including the quantized frame.

According to still another aspect of the present invention, there is provided a structure of a bitstream including coded image data obtained by performing video encoding on a frame, motion vectors obtained after motion estimation during the encoding, and a filtering application field indicating whether a spatial effect is applied during the encoding.

According to yet another aspect of the present invention, there is provided a video decoding method including interpreting an input bitstream and obtaining coded image data, motion vectors, and filtering information, applying inverse quantization to the coded image and then performing inverse transform on the dequantized image, and compensating for the image subjected to the inverse transform using the motion vector and the filtering information and reconstructing a video sequence.

According to a further aspect of the present invention, there is provided a video decoder including a bitstream interpreter interpreting an input bitstream and obtaining coded image data, motion vectors, and filtering information, an inverse quantizer applying inverse quantization to the coded image, an inverse transform unit performing inverse transform on the dequantized image, and a motion compensation and filtering unit compensating for the image subjected to the inverse transform using the motion vector and the filtering information and reconstructing a video sequence.

BRIEF DESCRIPTION OF THE DRAWINGS

The above and other features and advantages of the present invention will become more apparent by describing in detail exemplary embodiments thereof with reference to the attached drawings in which:

FIGS. 8A and 8B are diagrams for explaining a filtering operation according to a first embodiment of the present invention;

FIGS. 9A and 9B are diagrams for explaining a filtering operation according to a second embodiment of the present invention;

FIG. 10 is a diagram for explaining a filtering operation according to a third embodiment of the present invention;

FIG. 11 is a diagram for explaining a filtering operation according to a fourth embodiment of the present invention;

DETAILED DESCRIPTION OF THE INVENTION

The present invention will now be described more fully with reference to the accompanying drawings, in which exemplary embodiments of the invention are shown.

Figure 1:
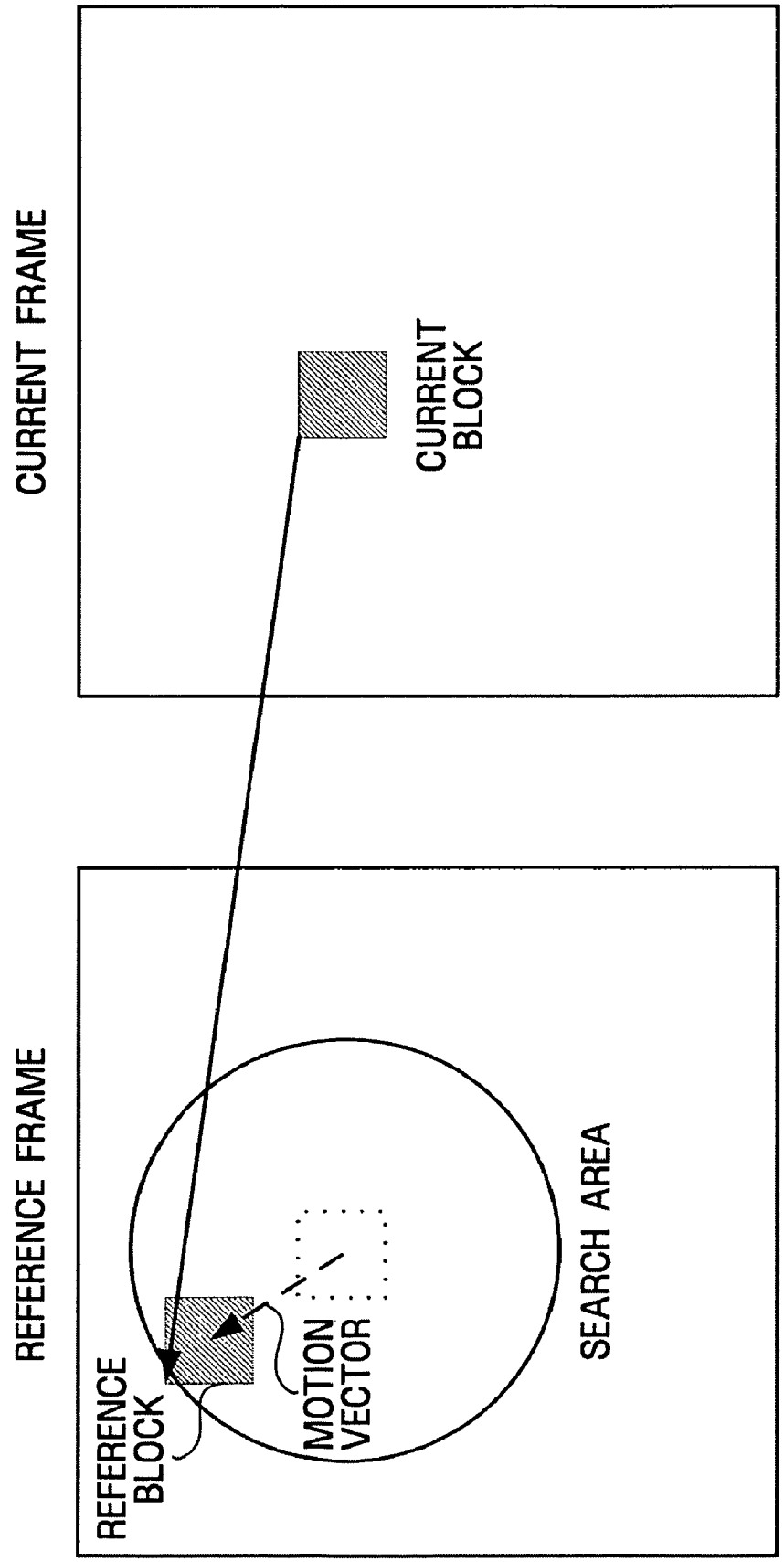
FIG. 1 is a diagram for explaining the concept of inter-frame prediction.
Figure 2:
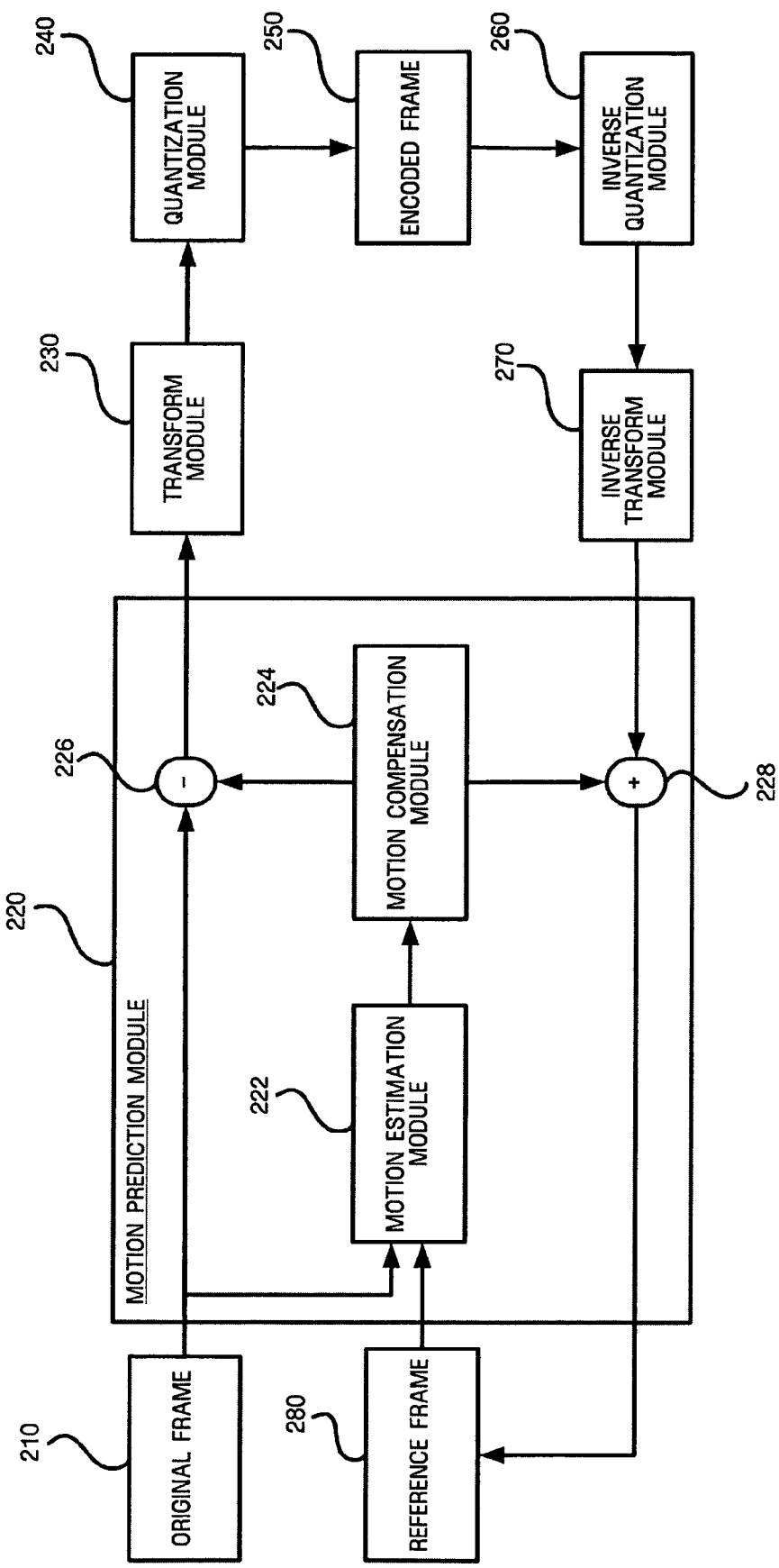
FIG. 2 is a block diagram of a conventional video encoder.
Figure 3:
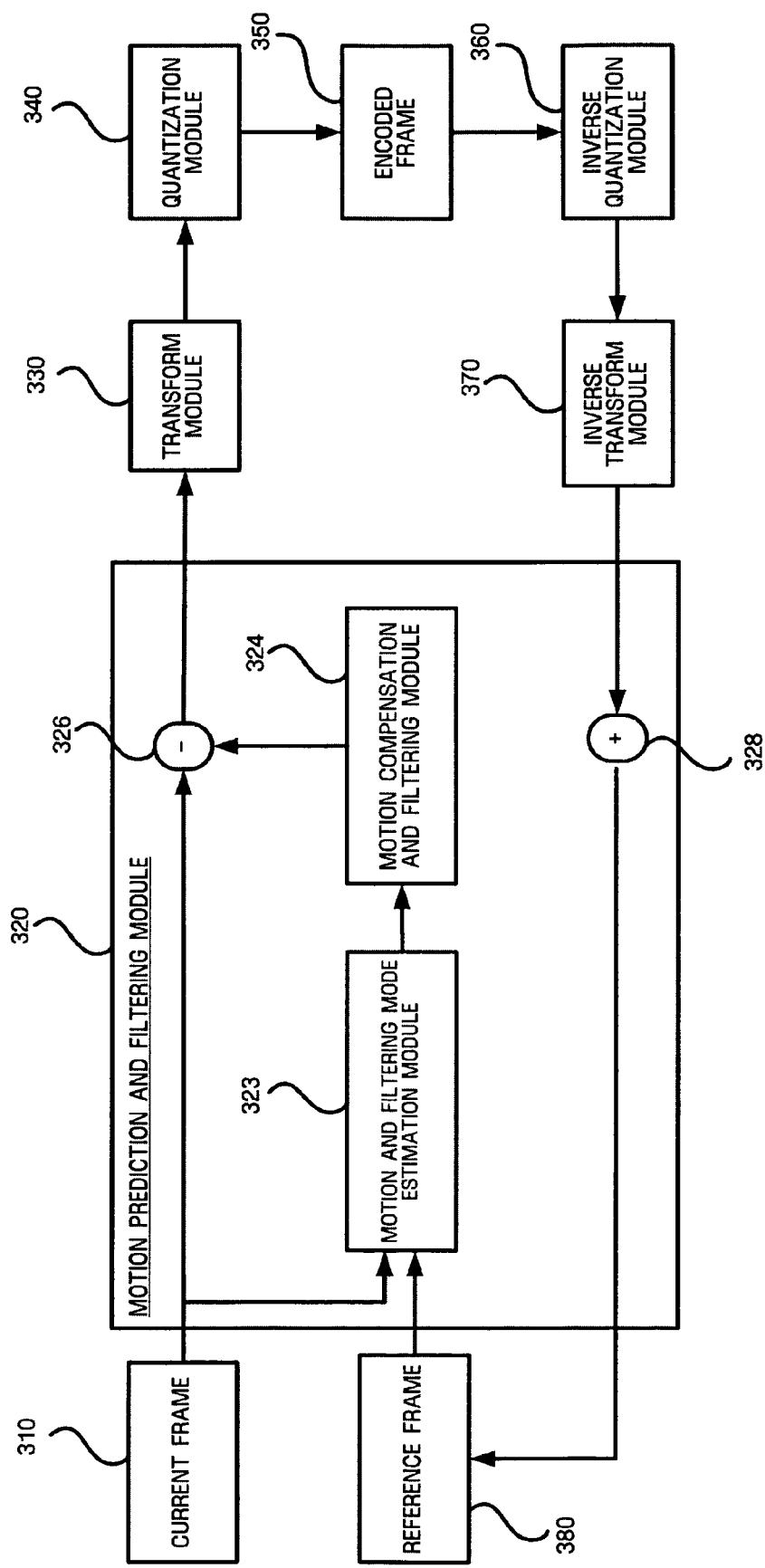
FIG. 3 is a block diagram of a video encoder according to an embodiment of the present invention.

FIG. 3 is a block diagram of a video encoder according to an embodiment of the present invention.

Referring to FIG. 3, a video encoder is a closed-loop video encoder. That is, an original frame currently being encoded ("current frame") is encoded using a frame reconstructed by decoding the previously encoded frame as a reference instead of the original frame.

To encode a current frame 310, the video encoder includes a motion prediction and filtering module 320, a transform module 330, and a quantization module 340. To obtain a reference frame 380 from an encoded frame 350, the video encoder further includes an inverse quantization module 360 and an inverse transform module 370.

The motion prediction and filtering module 320 includes a motion and filtering mode estimation module 322 and a motion compensation and filtering module 324. The motion and filtering mode estimation module 322 uses the reference frame 380 to estimate motion between the current frame 310 and the reference frame 380 and estimates a filtering mode defining a spatial effect therebetween. The motion compensation and filtering module 324 compensates for the motion of and filters the reference frame 380 according to the estimated motion vector and filtering mode, respectively. Estimation of the motion and filtering mode will be described in more detail later. The current frame 310 is compared with the motion-compensated and filtered reference frame by a comparator module 336 in order to generate a residual frame that is then transmitted to the transform module 330.

The transform module 330 performs spatial transform, such as Discrete Cosine Transform (DCT) that is widely used in MPEG-2 or MPEG-4 standard or wavelet transform that has been an active research area, on the residual frame, thereby removing spatial redundancy that exists within the residual frame.

The quantization module 340 applies quantization to the frame subjected to the spatial transform, thereby reducing the amount of data contained in the frame. The quantized frame then goes through an entropy encoding module (not shown) for entropy coding, and an encoded frame 350 is combined with motion vectors, filtering information, and necessary header information into a bitstream by a bitstream generator (not shown).

Meanwhile, the closed-loop video encoder uses a frame reconstructed by decoding the previously encoded frame 350 as the reference frame 380. To accomplish this, the inverse quantization module 360 dequantizes the encoded frame 350. The dequantized frame is then subjected to inverse spatial transform by the inverse transform module 370. The frame obtained after the inverse spatial transform (residual frame) is added to the motion-compensated and filtered reference frame by an addition module 336 in order to generate a reconstructed frame. The reconstructed frame can be used as the reference frame 380 to encode other frames.

On the other hand, to encode a frame as an intraframe, which is independently encoded without reference to any other frame, the frame is sent directly to the transform module 330 and the quantization module 340 without going through the motion prediction and filtering module 320. Decoding of the intra-coded frame is accomplished by passing through the inverse quantization module 360 and the inverse transform module 370.

In the embodiment illustrated in FIG. 3, the term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more computers in a communication system. Also, the components and modules may be embodied as computer readable programs on computer readable recording media.

Figure 4:
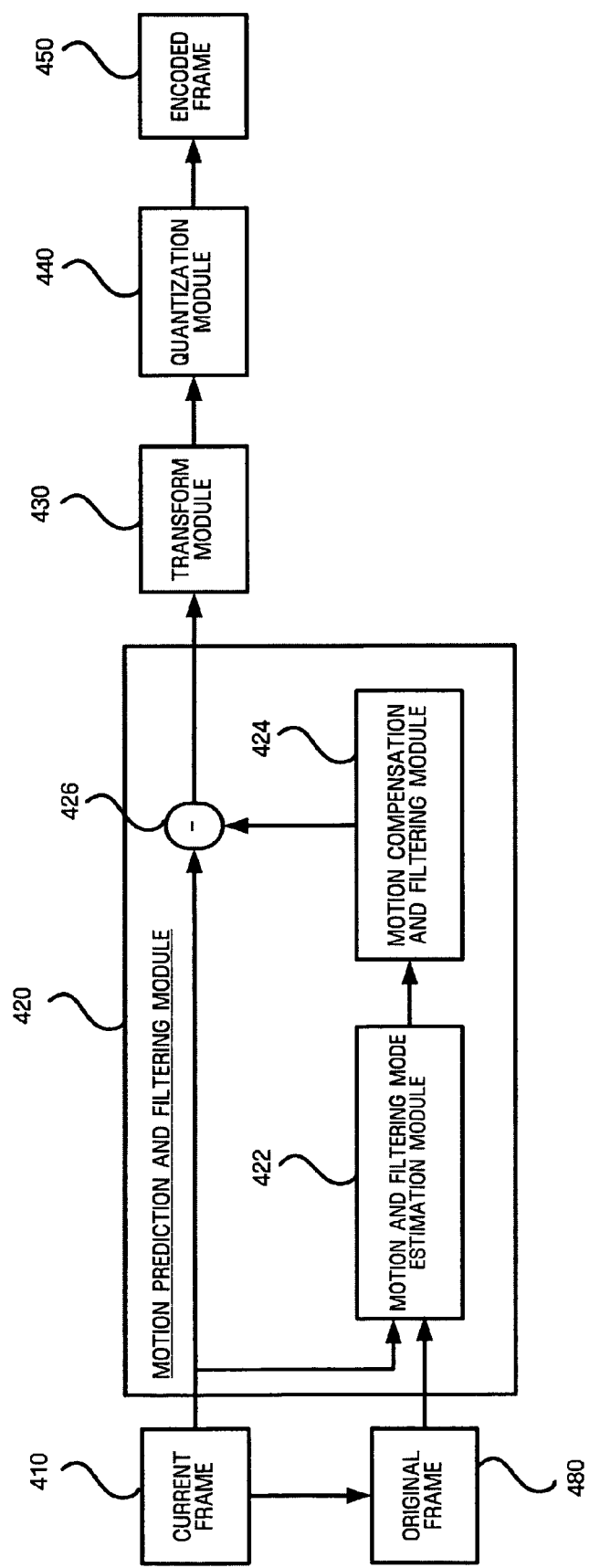
FIG. 4 is a block diagram of a video encoder according to another embodiment of the present invention.

FIG. 4 is a block diagram of a video encoder according to another embodiment of the present invention.

Referring to FIG. 4, the video encoder is an open-loop video encoder. That is, unlike in the first embodiment shown in FIG. 3, a current frame is encoded with reference to an original frame. Open-loop video coding provides lower image quality than closed-loop video coding since it uses the original frame as a reference for encoding while using a reconstructed frame as a reference during decoding. However, a Motion Compensation Temporal Filtering (MCTF)-based scalable video coding scheme employs an open-loop structure since it includes the step of updating a low-pass subband. The present embodiment can be applied to this case as well.

To encode a current frame 410, the video encoder includes a motion prediction and filtering module 420, a transform module 430, and a quantization module 440.

The motion prediction and filtering module 420 includes a motion and filtering mode estimation module 422 and a motion compensation and filtering module 424. The motion and filtering mode estimation module 422 uses an original frame 480 as a reference frame to estimate motion between the current frame 410 and the original frame 480 and estimates a filtering mode defining a spatial effect therebetween. The motion compensation and filtering module 424 compensates for the motion of and filters the original frame 480 according to the estimated motion vector and filtering mode, respectively. Estimation of the motion and filtering mode will be described in more detail later. The current frame 410 is compared with the motion-compensated and filtered reference frame by a comparator module 426 in order to generate a residual frame that is then sent to the transform module 430.

The transform module 430 performs spatial transform on the residual frame using Discrete Cosine Transform (DCT) that is widely used in MPEG-2 or MPEG-4 standard or wavelet transform that has been an active research area, thereby removing spatial redundancy that exists within the residual frame.

The quantization module 440 applies quantization to the frame subjected to the spatial transform, thereby reducing the amount of data contained in the frame. The quantized frame then goes through an entropy encoding module (not shown) for entropy coding, and an encoded frame 450 is combined with motion vectors, filtering information, and necessary header information into a bitstream by a bitstream generator (not shown).

Figure 5:
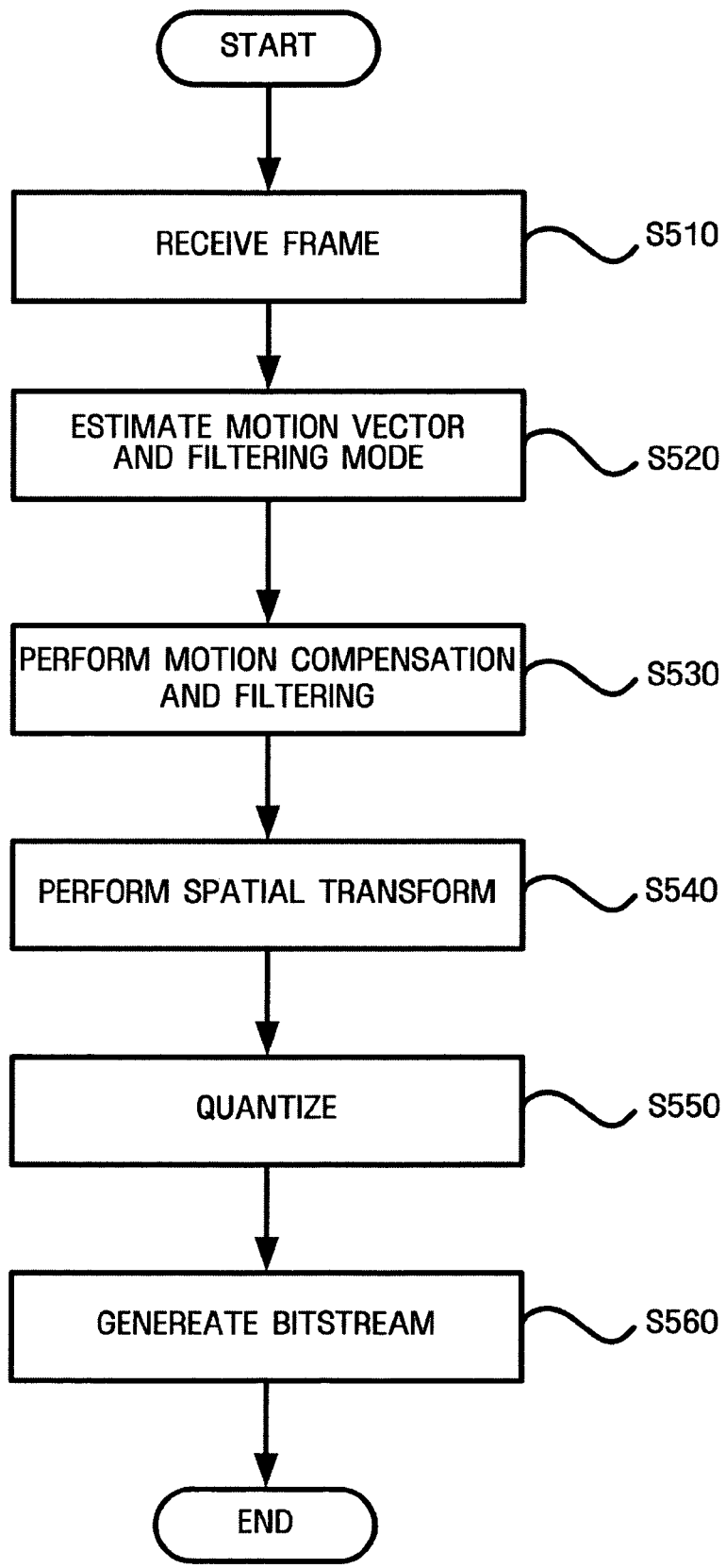
FIG. 5 is a flowchart illustrating a video encoding process according to an embodiment of the present invention.

FIG. 5 is a flowchart illustrating a video encoding process according to an embodiment of the present invention.

In step S510, a frame in a video sequence is received for video encoding. When the received frame is intercoded, in step S520, motion between each block in the received frame and reference block in a reference frame is estimated to obtain a motion vector and filtering mode defining a spatial effect between each block and a corresponding reference block is estimated. Estimation of a motion vector and a filtering mode will be described in more detail later with reference to FIGS. 6 and 7. A spatial effect will be described in more detail later with reference to FIGS. 8-13.

After estimation of the motion vector and the filtering mode, the motion of the reference frame is compensated in step S530. That is, the reference frame is filtered out according to the estimated filtering mode and then the current frame is compared with the filtered reference frame to obtain a residual frame.

In step S540, the residual frame obtained after the motion compensation and filtering is subjected to spatial transform such as DCT or wavelet transform to remove a spatial redundancy within the residual frame.

In step S550, the spatially transformed frame is quantized to reduce the amount of data contained in the frame.

In step S560, bitstream containing image data obtained by performing video encoding on a frame ("coded image data"), the motion vectors and the filing information obtained through the step S520, and appropriate headers are generated.

While a decoding process for reconstructing the original video sequence from the bitstream is the inverse of the encoding process, it does not include the motion vector and filtering mode estimation step. That is, to reconstruct a frame, the decoding process involves interpreting the bitstream, dequantization, inverse spatial transform, and motion compensation.

Figure 6:
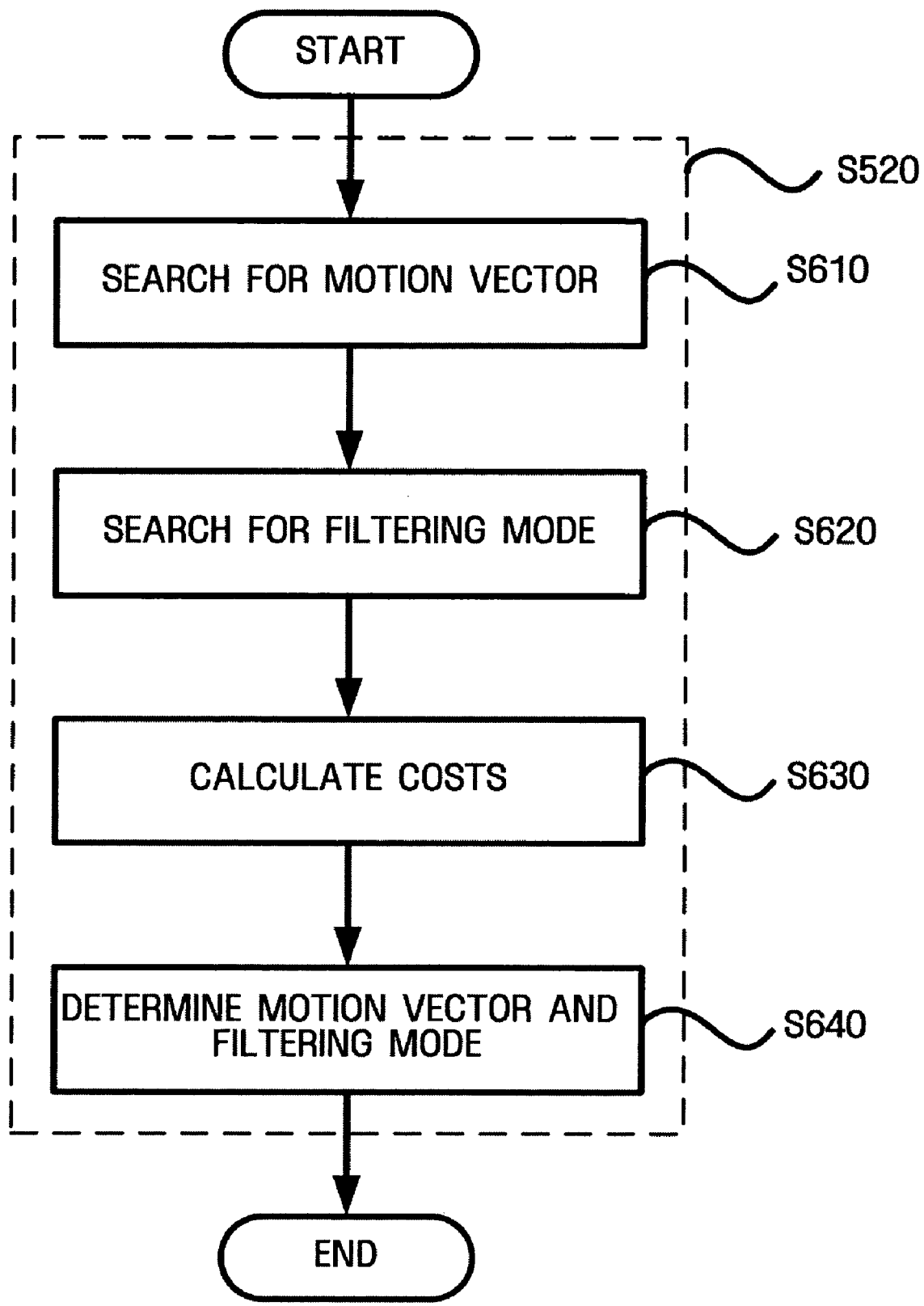
FIG. 6 is a flowchart illustrating a process of estimating a motion vector and a filtering mode according to an embodiment of the present invention.
Figure 7:
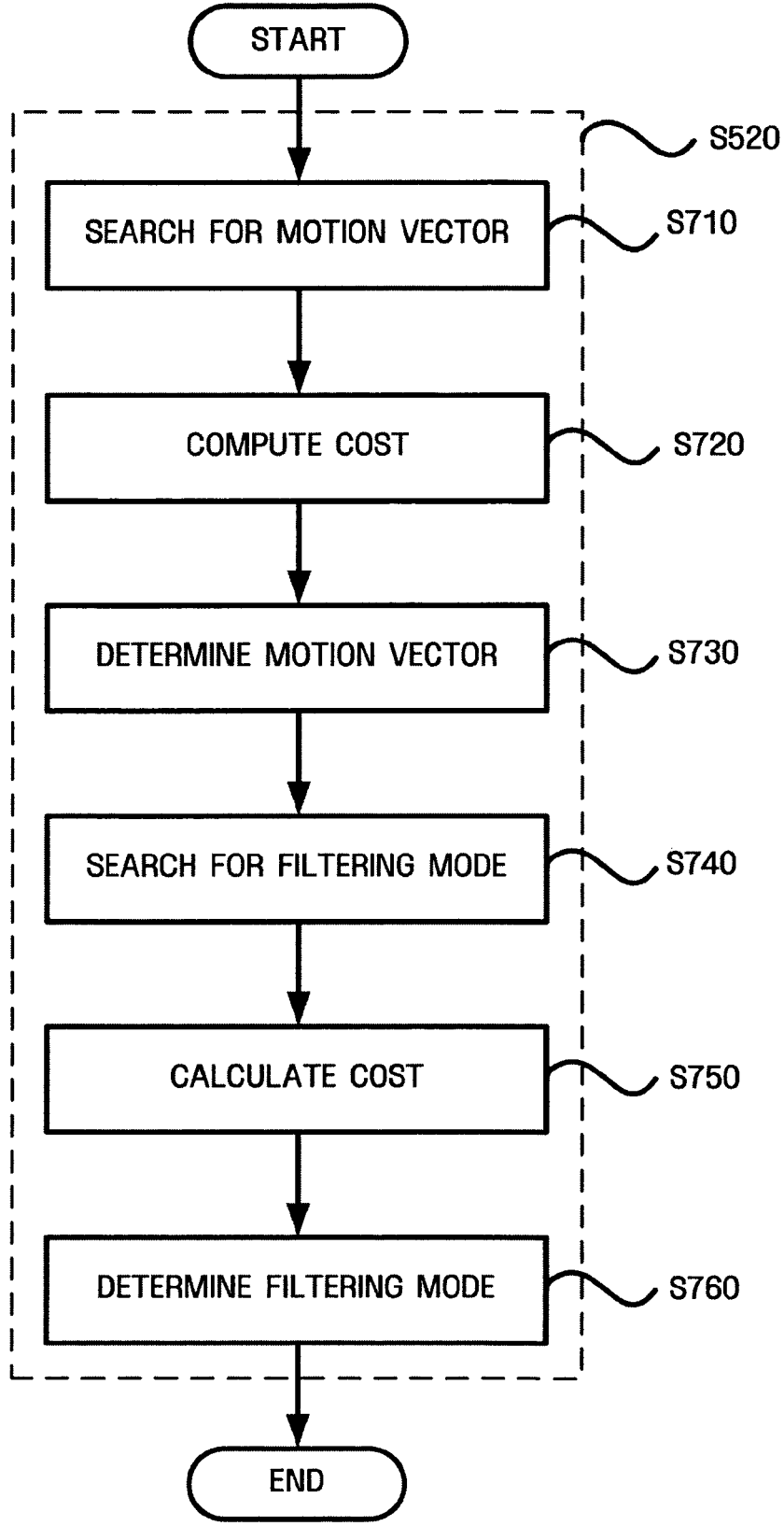
FIG. 7 is a flowchart illustrating a process of estimating a motion vector and a filtering mode according to another embodiment of the present invention.

FIGS. 6 and 7 are flowcharts respectively illustrating methods of estimating a motion vector and a filtering mode according to first and second embodiments of the present invention.

The motion vector and filtering mode estimation method according to the first embodiment shown in FIG. 6 includes comparing costs of various interceding cases using motion vector and filtering mode simultaneously and determining a motion vector and a filtering mode with a minimum cost. On the other hand, the method according to the second embodiment shown in FIG. 7 includes determining a motion vector with a minimum cost in intercoding using motion vector and then determining a filtering mode with a minimum cost for a block in a reference frame corresponding to the determined motion vector.

Determination of a motion vector and a filtering mode based on cost is for an illustrative purpose. According to other exemplary embodiments of the present invention, the motion vector and the filtering mode may be determined considering the amount of operations or other factors in the course of decoding.

Referring to FIG. 6, the estimation of motion vector and filtering mode according to the first embodiment of the present invention begins by performing a search to find candidate blocks that may be the reference block in a reference frame and a block currently being encoded ("current block") in a current frame in step S610. That is, a step finding blocks corresponding to the current block in the reference frame is performed. Then, each spatial effect is applied to each candidate block to obtain a filtering mode in step S620. For example, when the number of candidate blocks found in the step S610 is M and the number of filtering modes available in the present embodiment is N, M*N filtered candidate blocks can be selected.

After obtaining the motion vectors and the filtering modes, in step S630, motion compensation is performed for the current block using each candidate block as a reference and then costs for interceding are computed. After computing costs, in step S640, a candidate block used for intercoding having lowest cost is selected a reference block and then motion vector and filtering mode between the current block and the reference block are selected. The cost is defined by Equation (1):

$$C_f = E(k,-1) + \lambda_1 B(k,-1) + \lambda_2 F,$$

$$C_b = E(k,1) + \lambda_1 B(k,1) + \lambda_2 F,$$

$$C_{bi} = E(k,*) + \lambda_1 + B(k,*) + \lambda_2 F \quad (1)$$

where $C_f$, $C_b$, and $C_{bi}$ respectively denote costs for forward, backward, and bi-directional prediction modes. $E(k,-1)$, $E(k,1)$, and $E(k,*)$ respectively denote bits allocated to encode textures (images) using the forward, backward, and bi-directional prediction modes, and $B(k,-1)$, $B(k,1)$, and $B(k,*)$ respectively denote bits allocated to encode forward, backward, bi-directional motion vectors. F denotes bits required for filtering information according to a filtering mode, and $\lambda_1$ and $\lambda_2$ are Lagrangian coefficients used to control the balance among the bits allocated for representing motions, textures (images), and filtering information. Since a video encoder cannot recognize the final bit-rate, the Lagrangian coefficients $\lambda_1$ and $\lambda_2$ are used to optimize the characteristics of a video sequence and a bit-rate to be mainly used for a destination application.

In the present embodiment, it is possible to predict all blocks, contained in a frame being interceded, using a single mode according to type of the frame. This process is used in a conventional MPEG-2 algorithm. For example, all blocks in a P frame encoded based on forward prediction may be encoded using a forward prediction mode and only costs $C_f$ for a forward prediction mode are computed for comparison. Similarly, when encoding all blocks based on a backward prediction mode, only costs $C_b$ are calculated for comparison. For a B frame, only costs $C_{bi}$ are computed for comparison. Then, a motion vector and a filtering mode with a minimum cost are determined for each block.

However, predicting all blocks using a single mode is just an example. Therefore each block in a frame being intercoded may be encoded using a different prediction mode. For example, some blocks in a frame may be encoded using forward prediction, other blocks in the frame may be encoded using backward prediction, and the remaining blocks may be encoded using bi-directional prediction. In this case, a prediction mode is selected as one with the minimum cost by comparing costs defined by Equation (1).

The process shown in FIG. 6 allows estimation of motion vector and filtering mode with high accuracy but requires a large amount of computation. For example, when a single prediction mode is used to determine a motion vector and a filtering mode for each block among M candidate motion vectors and N filtering modes, a total number M*N of encoding operations should be performed in order to calculate costs for each block. Meanwhile, using three prediction modes as shown in Equation (1) requires 3*M*N computations, thereby increasing the number of computations by a factor of 3 compared to the use of a single prediction mode. As the resolution of a filtered value for each filtering mode increases, the number of computations increases. Furthermore, increasing the number of prediction modes used significantly increases the amount of computation.

A method for reducing the amount of computation when estimating a motion vector and a filtering mode will now be described with reference to FIG. 7.

Referring to FIG. 7, the motion vector and filtering mode estimation (S520) begins by performing a search to find candidate blocks corresponding to a current block in a reference frame in step S710. In step S720, a cost is calculated for each candidate block using Equation (2):

$$C_f = E(k,-1) + \lambda_1 B(k,-1),$$

$$C_b = E(k,1) + \lambda_1 B(k,1),$$

$$C_{bi} = E(k,*) + \lambda_1 + B(k,*) \quad (2)$$

where $C_f$, $C_b$, and $C_{bi}$ respectively denote costs for forward, backward, and bi-directional prediction modes. $E(k,-1)$, $E(k,1)$, and $E(k,*)$ respectively denote bits allocated to encode textures (images) using the forward, backward, and bi-directional prediction modes, and $B(k,-1)$, $B(k,1)$, and $B(k,*)$ respectively denote bits allocated to encode forward, backward, bi-directional motion vectors.

$\lambda_1$ denotes a Lagrangian coefficient used to control the balance among the bits allocated for representing motions and textures (images).

After calculating the costs, one of the candidate blocks is selected as a reference block to determine a motion vector between the current block and the reference block in step S730. According to an exemplary embodiment of the present invention, the candidate block minimizing the cost of intercoding the current block may be selected as the reference block.

In step S740, each spatial effect is applied to the selected reference block in order to perform a search for filtering modes. After performing the search, in step S750, a cost associated with intercoding of the current block according to the searched filtering mode is computed. Equation (1) may be used for the computation in step S750.

In step S760, after cost calculation, a filtering mode with the minimum cost is determined.

In the present embodiment, M+N computations are required to obtain the costs for each block since the number of computations in the step S720 is M (equal to the number of candidate blocks) and the number of filtering modes is N. Use of three prediction modes requires 3*M+N computations.

Filtering operations for achieving spatial effects according to embodiments of the present invention will now be described with references to FIGS. 8-13. While it is described above that filtering for spatial effect is applied to a reference frame, the filtering can also be applied to the current frame or both the current frame and the reference frame. For example, fade in/out can be used for either or both a current frame and a reference frame.

FIGS. 8A and 8B shows spatial effects when zoom in is used. For example, the size of an image increases with time when zoom in is used. In this case, a block in a reference frame selected by a motion vector has the same size as a block being encoded in a current frame while an area used for filtering in the reference frame is smaller than the current block. Thus, the selected block in a reference frame is upsampled to increase an image size by a predetermined ratio and then the area for filtering is compared with the current block. When a previous frame is used as the reference frame, i.e., forward prediction is used as shown in FIG. 8A, the selected block is upsampled. On the other hand, when backward prediction is used, the selected block is downsampled.

FIG. 8B shows a spatial effect when zoom out is used. That is, an area used for filtering in a reference frame is larger than a selected block matched with a current block. In this case, the area for filtering is downsampled and compared with the current block. When zoom in or zoom out is used, filtering information contains a filtering mode value (e.g., 1) specifying a spatial effect of zoom in/out and a zoom in/out ratio.

FIGS. 9A and 9B shows spatial effects when fade in and fade out are used.

Unlike in the spatial effect in FIG. 8, an area used for filtering has the same size as a block selected during motion estimation. For fade in or fade out, a predetermined value is added to the selected block in a reference frame. In a forward prediction mode, the predetermined value is positive for fade in while the value is negative for fade out. Conversely, in a backward prediction mode, the predetermined value is negative for fade in while it is positive for fade out.

When fade in or fade out is used, filtering information contains a filtering mode value (e.g., 2) specifying a spatial effect such as fade in or fade out and an added value. Adding a DC value for fade in and fade out compensates for illumination.

On the other hand, for a flickering image, the selected block may be multiplied by a predetermined ratio rather than a DC value being added to the selected block.

FIG. 10 shows a spatial effect when blurring is applied.

When the focus of an image is momentarily moved or the image is out of focus while recording video, the image may appear blurred. A reference frame applied filtering, such as low-pass filtering, which offer effect that image is blurred is compared with a current frame.

When image blurring is used, filtering information contains a filtering mode value (e.g., 3) specifying a spatial blurring effect and the amount of blurring.

FIG. 11 shows a spatial effect when overlap is applied.

When an object is momentarily moving while recording video, the moving object overlaps with the background. In this case, a block obtained by overlapping two blocks selected from a reference frame at a predetermined ratio as shown in FIG. 11 is compared with a current block.

When the overlap is used, filtering information contains a filtering mode value (e.g., 4) specifying a spatial overlap effect and a value x which is the predetermined ratio for overlapping two blocks.

Figure 12:
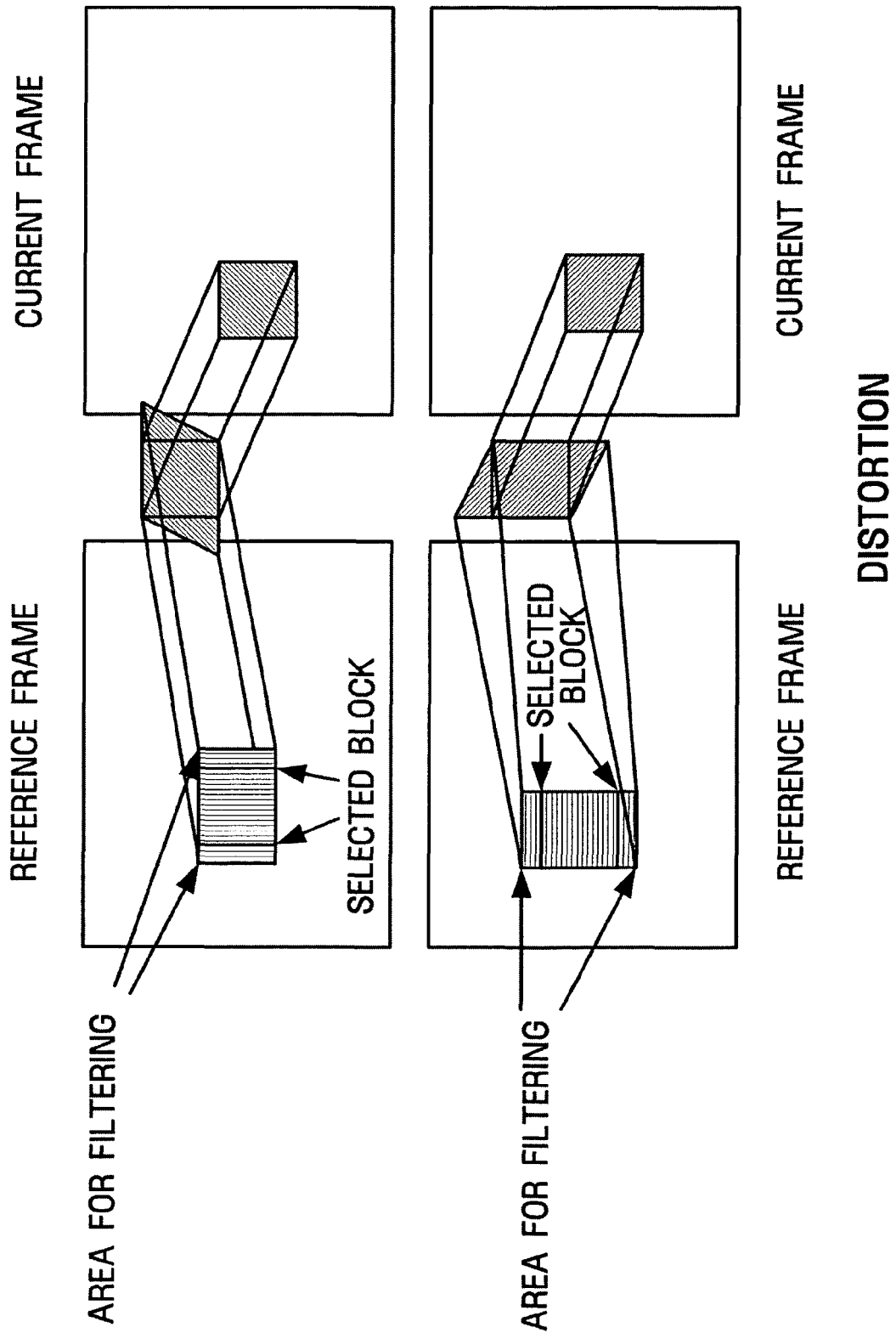
FIG. 12 is a diagram for explaining a filtering operation according to a fifth embodiment of the present invention.
Figure 13:
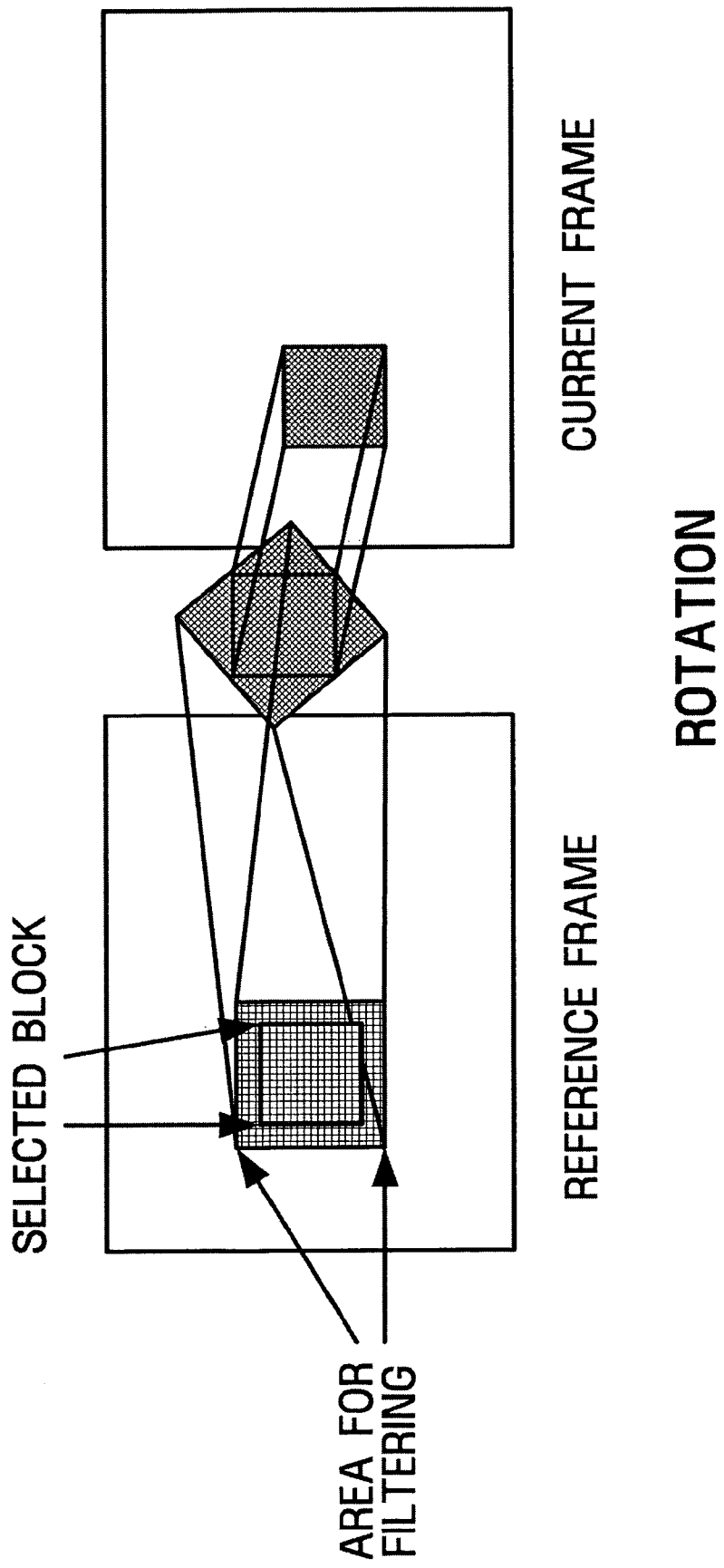
FIG. 13 is a diagram for explaining a filtering operation according to a sixth embodiment of the present invention.

In addition, FIG. 12 shows a spatial effect when distortion is applied and FIG. 13 shows spatial effect when rotation is applied.

For example, spatial distortion may apply when a tree is blowing in a wind. Spatial rotation may apply to wheels of a moving car.

Application of other spatial effects not discussed above will be construed as being included in the present invention. A filtering mode may not be applied when a profit obtained from application of a spatial effect is less than overhead incurred.

Figure 14:
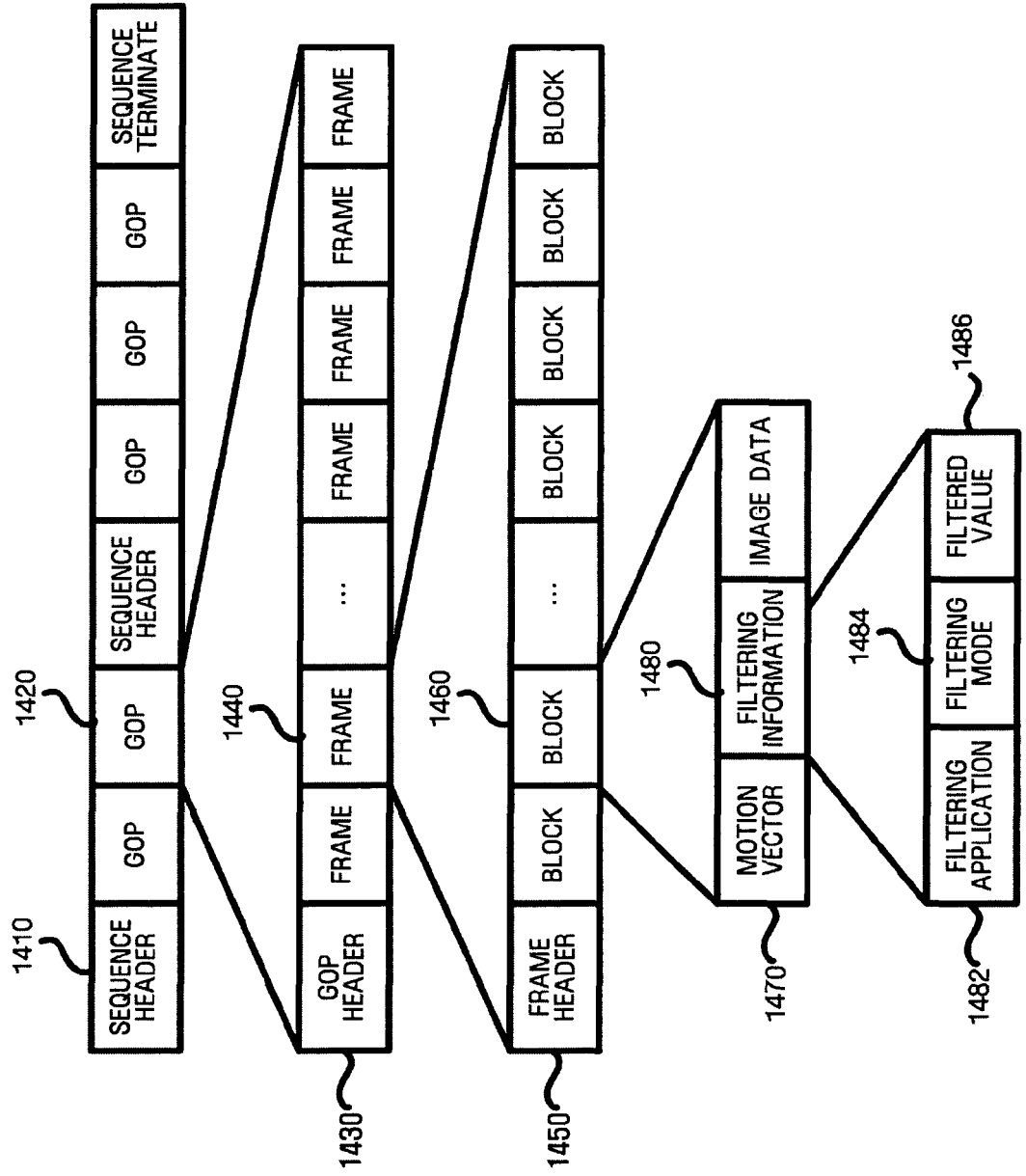
FIG. 14 shows the structure of a bitstream according to an embodiment of the present invention.

FIG. 14 shows the structure of a bitstream according to an embodiment of the present invention.

A bitstream for a single content is composed of at least one video sequence. Each video sequence consists of a sequence header 1410 followed by at least one GOP 1420. The sequence header 1410 contains information such as resolution and frame rate of the appropriate sequence. When a plurality of video coding schemes is used, the sequence header 1410 also contains information indicating the type of a video coding scheme used.

The GOP 1420 includes a GOP header 1430 followed by one or more frames 1440. The GOP header 1430 contains information such as a GOP size, a frame rate, or a resolution.

Each frame 1440 is composed of a frame header 1450 and at least one block 1460. Intercoded frame contains motion vector and filtering information. While the motion vector 1470 and the filtering information 1480 may be contained in each block as shown in FIG. 14, or they may be concentrated in one portion of the appropriate frame. Each block in the latter case contains coded image data while in the former case, it contains the motion vector 1470 and the filtering information 1480 in addition to coded image data.

The filtering information 1480 may further contain a filtering application field 1482 in addition to a filtering mode field 1484 and a filtered value field 1486. For example, when eight filtering modes are available, three bits are required for each block to identify the modes. If no filtering is applied for most blocks, unnecessary three bits of overhead may occur for each block. In the present invention, the 1-bit filtering application field 1482 is used to specify whether filtering is applied. That is, when no filtering is used, the filtering application field 1482 (for example, '0') indicates that no filtering is applied. Thus, only one bit of overhead increases for each block as compared with the conventional structure, since the filtering information 1480 does not necessarily include the filtering mode field 1484 and the filtered value field 1486. On the other hand, when the filtering is applied, the filtering application field 1482 (e.g., '1') indicates that the filtering is applied. The filtering mode field 1484 and the filtered value field 1486 respectively specify the type of filtering used and the filtered value.

Figure 15:
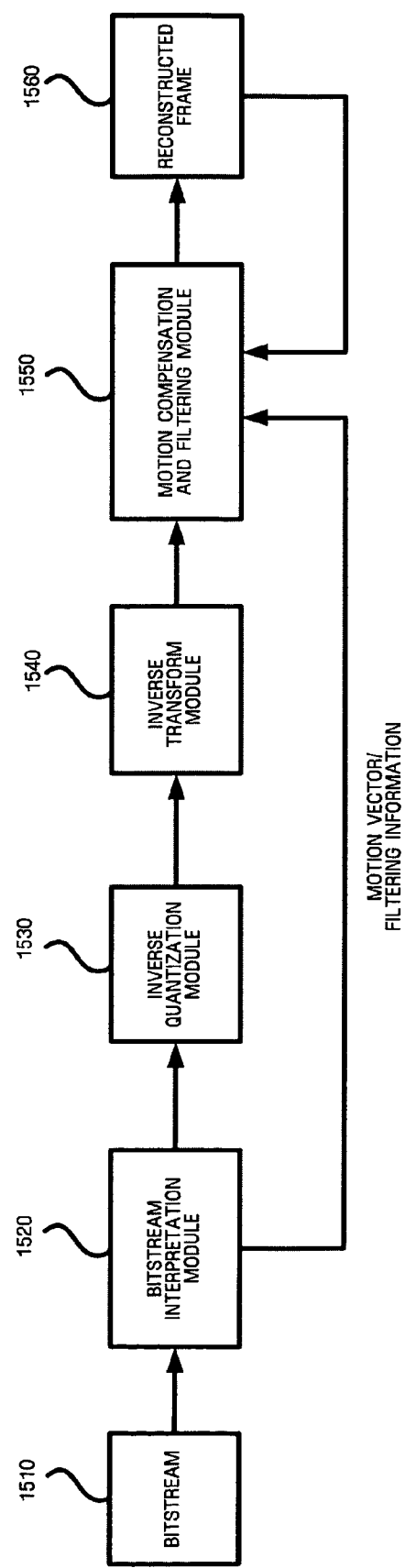
FIG. 15 is a block diagram of a video decoder according to an embodiment of the present invention.

FIG. 15 is a block diagram of a video decoder according to an embodiment of the present invention.

The video decoder receives a bitstream 1510 and reconstructs a video sequence from the bitstream. To accomplish this, the video decoder includes a bitstream interpretation module 1520 interpreting the input bitstream 1510, an inverse quantization module 1530, an inverse transform module 1540, and a motion compensation and filtering module 1550.

The bitstream interpretation module 1520 interprets the input bitstream 1510 to obtain coded image data, motion vectors, and filtering information. The coded image (frame) data is transmitted to the inverse quantization module 1530 while the motion vectors and the filtering information are sent to the motion compensation and filtering module 1550.

The inverse quantization module 1530 applies inverse quantization to the coded image data. According to an exemplary embodiment of the present invention, a quantization table used for quantization may be transmitted from the bitstream 1510 for inverse quantization. The image data subjected to the inverse quantization is sent to the inverse transform module 1540.

The inverse transform module 1540 inversely transforms the dequantized image. When the image is encoded using DCT, the image is subjected to inverse DCT transform. When the image is encoded using wavelet transform, the image is subjected to inverse wavelet transform. When a frame is an intraframe encoded without reference to any other frame, the frame can be reconstructed after going through the inverse transform. However, when a frame is an interceded frame, the frame is sent to the motion compensation and filtering module 1550 before reconstruction.

The motion compensation and filtering module 1550 uses a reconstructed frame 1580 as a reference frame to reconstruct a frame from the inversely transformed image using motion vectors and filtering information. That is, the motion compensation and filtering module 1550 applies spatial effect to a reference frame according to the filtering information and compensates for the motion of the reference frame using the motion vectors and then adds the motion-compensated reference frame to the inversely transformed image in order to generate the reconstructed frame 1580.

In concluding the detailed description, those skilled in the art will appreciate that many variations and modifications can be made to the exemplary embodiments without substantially departing from the principles of the present invention. Therefore, the disclosed exemplary embodiments of the invention are used in a generic and descriptive sense only and not for purposes of limitation.

As described above, the inter-frame prediction method according to the present invention allows efficient video coding under various circumstances. The method also provides a high video coding efficiency by reducing overhead required for video coding as much as possible.

What is claimed is:

1. A video decoding method comprising:
   interpreting, with a bitstream interpreter, an input bitstream and obtaining coded image data, motion vectors, and filtering information;
   applying, with an inverse quantizer, inverse quantization to the coded image data to generate a dequantized image and then performing inverse transform on the dequantized image; and
   compensating, with a motion compensation and filtering unit, for the coded image data subjected to the inverse transform using the motion vectors and the filtering information and reconstructing a video sequence;
   wherein the filtering information comprises a 1-bit filtering application field which indicates whether filtering is applied, and
   when a value in the filter application field indicates filtering is not applied, additional information regarding filters and a manner of applying the filters is not transmitted in the input bitstream.

2. The method of claim 1, wherein the reconstructing of the video sequence comprises:
   finding a block in a reference frame being referenced by an inversely transformed image generated by performing the inverse transform, using the motion vectors;
   applying a spatial effect to the found block according to the filtering information; and
   adding the block subjected to the spatial effect to the inversely transformed image in order to generate a reconstructed video sequence.

3. The method of claim 2, wherein the spatial effect defined by the filtering information includes at least one of zoom in, zoom out, fade in, fade out, blurring, overlap, distortion, and rotation.

4. A non-transitory computer readable recording medium having a computer readable program recorded therein, the program for executing the method of claim 1.

5. A video decoder comprising:
   a bitstream interpreter interpreting an input bitstream and obtaining coded image data, motion vectors, and filtering information;
   an inverse quantizer applying inverse quantization to the coded image data to generate a dequantized image;
   an inverse transform unit performing inverse transform on the dequantized image; and
   a motion compensation and filtering unit compensating for the coded image data subjected to the inverse transform using the motion vectors and the filtering information and reconstructing a video sequence;
   wherein the filtering information comprises a 1-bit filtering application field which indicates whether filtering is applied, and
   when a value in the filter application field indicates filtering is not applied, additional information regarding filters and a manner of applying the filters is not transmitted in the input bitstream.

6. The video decoder of claim 5, wherein the motion compensation and filtering unit finds a block in a reference frame being referenced by the inversely transformed image generated by the inverse transform unit using the motion vectors, applies a spatial effect to the found block according to the filtering information, and adds the block subjected to the spatial effect to the inversely transformed image in order to generate a reconstructed video sequence.

7. The video decoder of claim 5, wherein the spatial effect defined by the filtering information includes at least one of zoom in, zoom out, fade in, fade out, blurring, overlap, distortion, and rotation.

* * * * *